J. TURNER & S. TURNER.
Machines for Cutting Biscuit.

No. 137,114.                  Patented March 25, 1873.

UNITED STATES PATENT OFFICE.

JOHN TURNER AND SYDNEY TURNER, OF TORONTO, CANADA.

IMPROVEMENT IN MACHINES FOR CUTTING BISCUIT.

Specification forming part of Letters Patent No. 137,114, dated March 25, 1873.

*To all whom it may concern:*

Be it known that we, JOHN TURNER and SYDNEY TURNER, both of the city of Toronto, Province of Ontario, Canada, have invented certain Improvements in Machines for Cutting Biscuits, of which the following is a specification:

Our invention relates to certain new and useful improvements in machines for cutting biscuits; and consists in attaching the cutters to movable spindles or guides, which are operated by levers so arranged that the power is increased as the cutters enter the paste, and when through their motion hesitates, as it were, by which the paste becomes completely separated before they are withdrawn.

Figure 1:
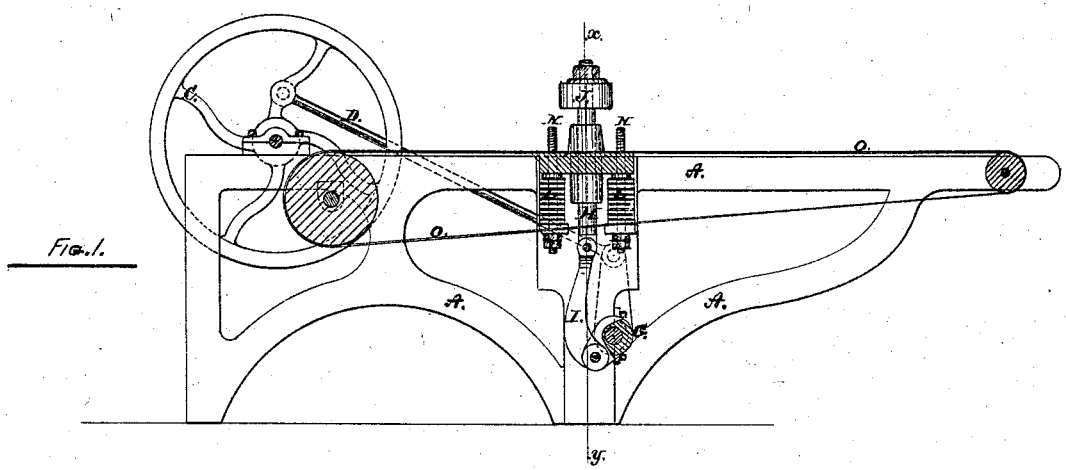
Figure 2:
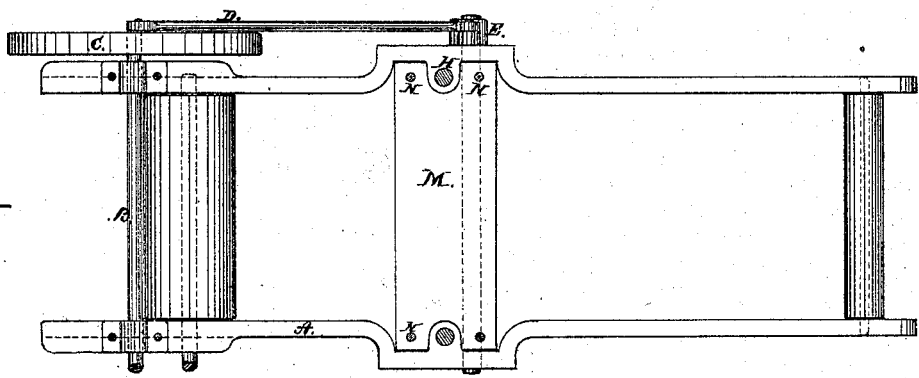
Figure 3:
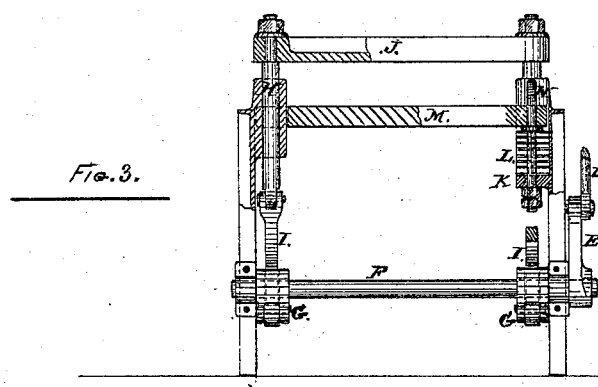

Figure 1 is a sectional side elevation. Fig. 2 is a plan without endless apron. Fig. 3 is a cross-section through $x$ $y$.

General Description.

A is the frame of the machine, which may be made of any suitable design and of appropriate material. B is the driving-shaft, working in bearings fastened to the frame A. At one end of this shaft is keyed or otherwise fastened the driving-wheel C, which also acts as a fly-wheel. D is a rod connecting C to the lever E, which is secured to the rocking-shaft F. To this shaft the two short levers G are keyed. The movable spindles or guides H are connected at their lower ends to the short levers G by the connecting-links I. The cross-head or cutter-pan J connects these two spindles and is securely bolted to them, as shown. To the bottom of the cutter-pan the knives and cutters are fastened, which being similar to those now in common use require no explanation, nor have we thought it necessary to exhibit them in the drawing. K are lugs cast onto the frame A. Upon these lugs rest the springs L, which support the table or bed-plate M. The studs N pass through all three of these, as shown, and upon them is also fastened the guard-plate, between which and the bed-plate M the dough is carried by the apron O. This guard-plate is also in common use and requires no explanation. By reference to Fig. 2, it will be noticed that in the center, where the cutter-pan J works, the frame A is set out in order to keep the studs and spindles clear of the aprons. On the end of the driving-shaft B opposite to wheel C is keyed a pulley or hand wheel, from which our machine derives its motion in the usual manner.

From the description of the construction of the machine it will be understood that as the wheel C revolves the cutter-pan J connected to the spindles H derives a vertical reciprocating motion, performing its work as the dough is carried beneath it by the apron O in the usual manner. We now wish to draw your particular attention to the connection between the short levers G and the movable guides H. The links I forming this are shaped as shown in Fig. 1, and fit into "she-joints" in the short levers G, as may be understood by the drawing. The cutter-pan is, of course, brought down as the levers G descend, and the levers E and G are so set relatively to each other that as the rod D passes a "dead-center" on the wheel C the short levers G are lowered to their extreme point, but continue to move across their centers. This motion, of course, affects the spindles H, and the cutter-pan J hesitates or remains momentary at the point referred to, which, by the aforesaid levers being specially set for the purpose, happens to be just as the cutters have passed through the dough or paste. This hesitation, as we said before, allows the dough to be thoroughly separated before the cutters dividing it into biscuits have been withdrawn. Another advantage which we gain is the increase of power as the cutters are passing through the dough attained from the shortening of the levers G as they descend.

What we claim as our invention is—

Attaching the cutter-pan J in a solid manner to the movable spindles H, and, by the combination of the links I, short levers G, rocking-shaft F, and lever E, imparting to the said cutter-pan a hesitating motion, substantially as and for the purpose specified.

Toronto, December 9, 1872.

JOHN TURNER.
SYDNEY TURNER.

Witnesses:
J. HERBERT BARTLETT,
WM. SHEPPARD.